Aug. 6, 1957  D. G. LOGAN ET AL  2,801,470
DENTAL ARTICULATOR ATTACHMENT
Filed Aug. 19, 1955  3 Sheets-Sheet 1

Donald G. Logan
Albert M. La Fleur
INVENTORS

Donald G. Logan
Albert M. LaFleur
INVENTORS

Aug. 6, 1957 D. G. LOGAN ET AL 2,801,470
DENTAL ARTICULATOR ATTACHMENT
Filed Aug. 19, 1955 3 Sheets-Sheet 3
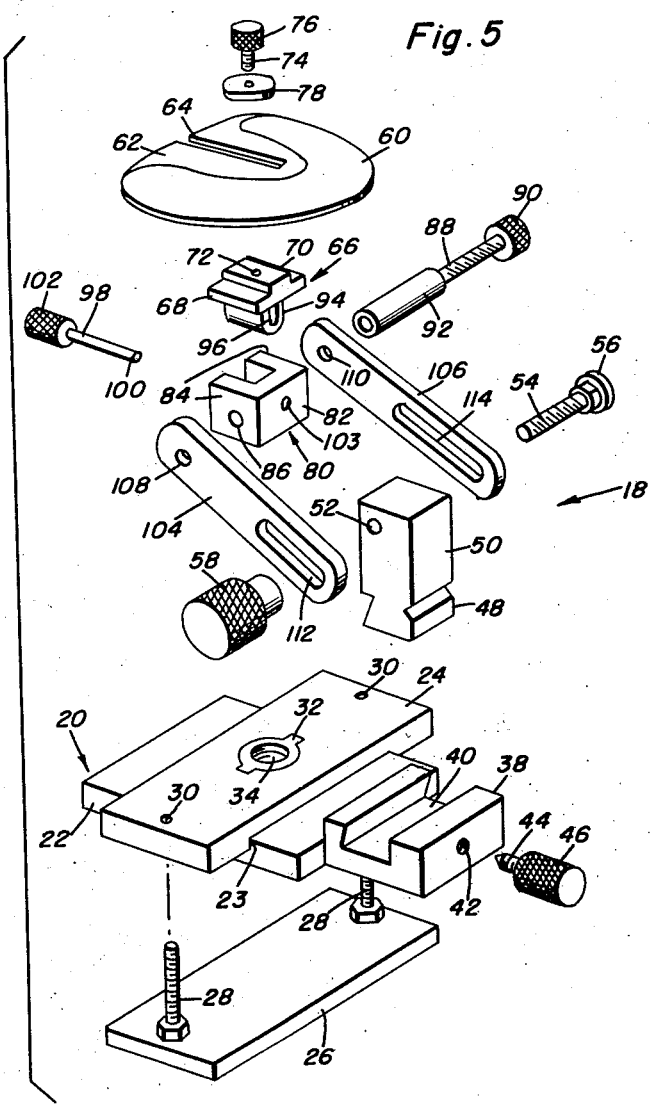
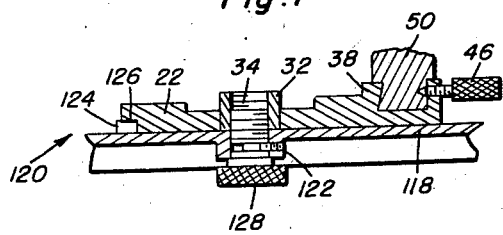
Donald G. Logan
Albert M. LaFleur
INVENTORS
BY
Attorneys 2,801,470
Patented Aug. 6, 1957

2,801,470
DENTAL ARTICULATOR ATTACHMENT

Donald G. Logan and Albert M. La Fleur, Shawnee, Okla.

Application August 19, 1955, Serial No. 529,478

13 Claims. (Cl. 32—32)

This invention relates in general to new and useful improvements in dental devices for use in the articulation of artificial teeth, and more specifically to an improved dental articulator attachment.

In the usual practice of arranging artificial teeth on the denture, in order to attain as nearly as possible the natural anatomical articulation, the dentist ordinarily uses an articulator which includes a lower jaw and an upper jaw, the upper jaw being pivotable and adjustment with respect to the lower jaw. In the use of such an articulator, it is necessary that the dentist obtain an accurate model of both the upper and lower jaws of the patient together with what are commonly referred to as bite models, the bite models being waxed fillers which space the jaw models a distance equal to the normal distance maintained by the patient's teeth. After the upper and lower jaw models and their particular bite models have been properly positioned in the articulator, it is necessary that there be mounted on the bite models the artificial teeth. However, the bite models in themselves do not provide any guide for the artificial teeth and of necessity the dentist making the artificial denture must align the teeth by eye. Further, any attempt to remove the jaw models and the bite models from the articulator would result in a difficult task of realigning them.

It is therefore the primary object of this invention to provide an improved dental articulator attachment which is so constructed whereby a template which forms a part of the attachment may be properly set with respect to initially positioned teeth which determine the occlusal plane and which will form both a support and an aligning template for the remainder of the teeth being placed.

Still another object of this invention is to provide an improved dental articulator attachment which includes a template and support means therefor, the support means being of such a nature whereby the template may be quickly and easily aligned with initially set teeth of an artificial denture.

Still another object of this invention is to provide an improved dental articulator attachment which includes a teeth aligning template and support means therefor, the support means being of such a nature whereby they may be readily attached to articulators of all types.

Another object of this invention is to provide an improved dental articulator attachment which includes a teeth aligning template, the template being provided with support means of such a nature whereby the template may be positioned vertically, longitudinally, transversely and at desired angles with respect to the articulator so that the template will follow the original occlusal plane of the patient for whom the artificial dentifrice is being made.

A still further object of this invention is to provide an improved dental articulator attachment which includes a teeth aligning and supporting template, the template being readily positioned in the desired occlusal plane and being so mounted whereby it may be shifted to properly set all of the patient's artificial teeth and at the same time will remain in the predetermined occlusal plane.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is an exploded perspective view on a slightly reduced scale of all of the elements of the articulator attachment and shows the specific details thereof;

Figure 6:
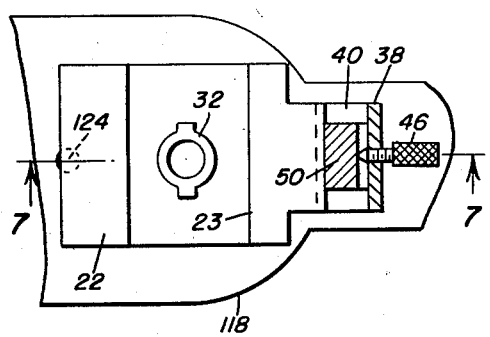
Figure 4:
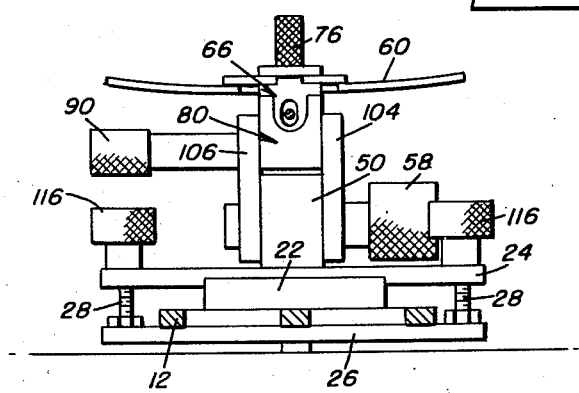
Figure 4 is a fragmentary transverse vertical sectional view taken substantially upon the plane indicated by the section line 4—4 of Figure 1 and shows the manner in which the articulator attachment is adjustably clamped to the lower jaw or base of the articulator.

Figure 6 is a fragmentary horizontal sectional view taken through the articulator attachment just above a base thereof and shows the manner in which the base block is slidably mounted in a guideway carried by the base; and Figure 7 is an enlarged fragmentary longitudinal vertical sectional view taken substantially upon the plane indicated by the section line 7—7 of Figure 6 and shows the manner in which the base of the articulator attachment is secured to a modified form of articulator.

Referring now to Figures 1 to 4, inclusive, it will be seen that there is illustrated a conventional type of articulator which is referred to in general by the reference numeral 10. The articulator 10 includes a fixed lower jaw 12 and a movable upper jaw 14. The upper jaw 14 is adjustably carried by a pair of upstanding arms 16 which extend upwardly from the rear part of the lower jaw 12. It is to be understood that the articulator 10 includes many other features which are conventional and play no part in the present invention. Accordingly, these additional features will not be described hereinafter.

Carried by the dental articulator 10 and secured to the lower jaw 12 thereof is the articulator attachment which is the subject of this invention, the articulator attachment being referred to in general by the reference numeral 18. As is best illustrtaed in Figure 5, the articulator attachment 18 includes a base which is referred to in general by the reference numeral 20. The base 20 includes a base plate 22 which has formed in the upper surface thereof a transverse recess 23. Seated in the transverse recess 24 and shiftable transversely with respect to the base plate 22 is an upper clamp plate 24. Underlying the base plate 22 is a lower clamp plate 26. The clamp plate 26 has fixed thereto a pair of upstanding threaded fasteners 28 which pass through bores 30 in the upper clamp plate 24. The manner in which the clamp plates 24 and 26 are utilized to clamp the base plate 22 in place on the articulator, such as the articulator 10, will be set forth in more detail hereinafter.

It is to be noted at this time that the upper clamp plate 24 also includes an insert 32. The insert 32 includes an internally threaded bore 34. Aligned with the bore 34 is a transverse slot 36 in the base plate 22, the slot 36 being best illustrated in Figure 1 and receiving a depending portion of the insert 32.

Secured to the forward edge of the base plate 22 and extending forwardly therefrom is a guide block 38. The guide block 38 is provided with a transverse dovetail guideway 40. The forward part of the guide block 38 is also provided with a longitudinally extending, internally threaded bore 42 which opens into the guideway 40. Threadedly engaged in the bore 42 is a threaded portion 44 and a lock screw 46.

Normally seated in the guideway 40 is a complementary lower portion 48 of an upstanding base block 50. The base block 50 is selectively positioned transversely of the base 20 and is retained in a selected position by the set screw 46.

The upper rear part of the base block 50 is provided with a transverse bore 52. Extending through the transverse bore 52 is a threaded pivot pin 54 having a head 56 at one end thereof. Removably carried by the pivot pin 54 on the end thereof opposite from the head 56 is a nut member 58.

The articulator attachment 18 also includes a template 60. The template 60 is for the purpose of supporting and aligning teeth and may be considered a teeth aligning template. The template 60 includes a depressed central rear portion 62 in which there is formed an elongated longitudinal recess 64 opening through the rear edge of the template.

In order that the template 60 may be conveniently mounted, there is provided a template mounting block which is referred to in general by the reference numeral 66. The template mounting block 66 includes a base portion 68 which has extending upwardly therefrom a projecting guide portion 70. The guide portion 70 is of a size to be received in the slot 64 to guide the template 60 for longitudinal sliding movement with respect to the template mounting block 66. In order that the template 60 may be clamped in adjusted position on the template mounting block 66, the projection 70 is provided with a vertical internally threaded bore 72. Normally engaged in the bore 72 is a threaded portion 74 of a clamp screw 76. Carried by the threaded portion 74 is a washer 78 which overlies the central rear portion 62 of the template 60 to facilitate clamping of the template 60 to the template mounting block 66.

Disposed below the template mounting block 66 is a support block which is referred to in general by the reference numeral 80. The support block 80 includes a transverse forward portion 82 and a pair of rearwardly extending portions 84. Formed in the rearwardly extending portions 84 is a transverse bore 86.

Normally extending through the bore 86 is a threaded pivot pin 88 which has an enlarged head 90. The pivot pin 88 is considered the first pivot pin and the pivot pin 54 is considered a second pivot pin. The pivot pin 88 is relatively elongated and is provided with a spacing sleeve 92.

In order that the template mounting block 66 may be mounted for transverse tilting movement in order to permit transverse tilting of the template 60, the base portion 68 thereof is provided with a depending rib 94. The rib 94 includes a longitudinal slot 36 therethrough, the slot 96 being vertically elongated.

In order that the template mounting block 66 may be pivotally secured to the support block 80, there is provided a longitudinal pivot pin 98. The pivot pin 98 includes a threaded end 100 and head 102. The forward portion 82 of the support block 80 is provided with an internally threaded bore 103 for receiving the threaded portion 100.

When the template mounting block 66 is positioned with respect to the support block 80, it is clamped in place by the longitudinal pivot pin 98. By loosening the pivot pin 98, the template mounting block 66 is free to pivot to permit transverse tilting of the template 60. Also, in view of the position of the vertically elongated slot 96, a slight longitudinal tilting as well as a slight vertical adjustment is permitted.

Extending between the base block 50 and the support block 80 disposed on opposite sides thereof is a pair of elongated links 104 and 106. The upper or first of the links 104 is provided with an internally threaded bore 108. A similar plain bore 110 is formed in the first end of the link 106. The first pivot pin 88 extends through the bore 110, through the bores 86 and is threadedly engaged in the bore 110. When the pivot pin 90 is tightened down, the spacing sleeve 92 clamps against the link 106 so as to clamp the links 104 and 106 against opposite sides of the support block 80 to maintain it in adjusted position. It is to be understood that the support block 80 may be tilted about the pivot pin 88 as desired.

The second or lower ends of the links 104 and 106 are provided with elongated slots 112 and 114. Selectively positioned in the slots 112 and 114 is the second pivot pin 54. By providing the slots 112 and 114, the template 60 may be slid back and forth longitudinally of the articulator 10 as well as vertically positioned as desired.

Figure 1:
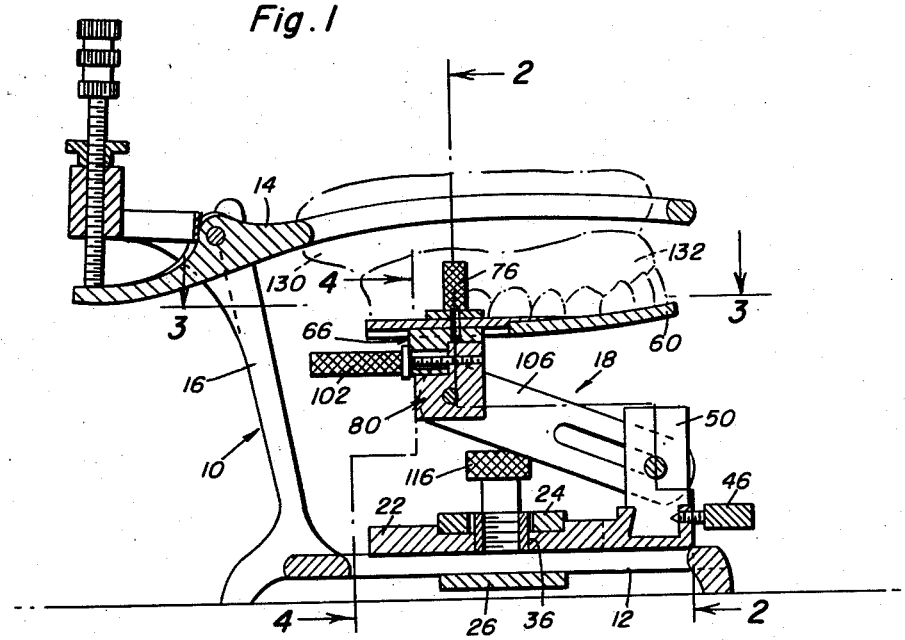
Figure 1 is a longitudinal vertical sectional view taken through a special type of articulator having mounted thereon the dental articulator attachment which is the subject of this invention, the section also being taken through the articulator attachment in order to fully illustrate the details thereof.
Figure 2:
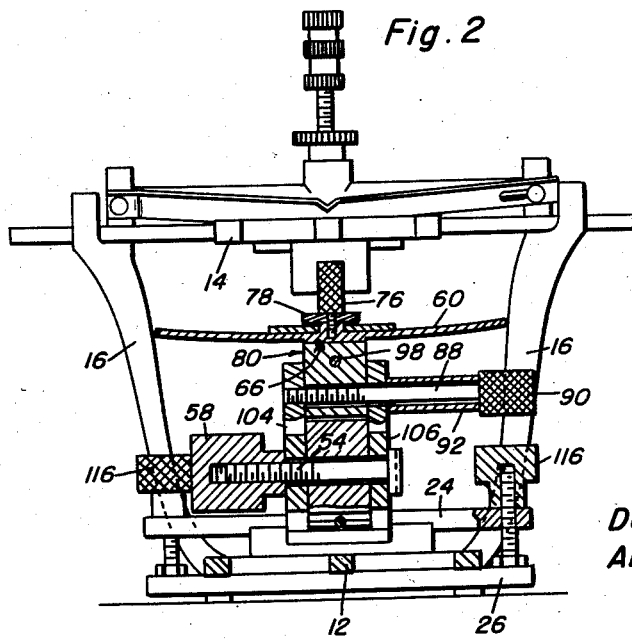
Figure 2 is a transverse vertical sectional view taken substantially upon the plane indicated by the section line 2—2 of Figure 1 and shows further numerous attachments of the articulator attachment.
Figure 3:
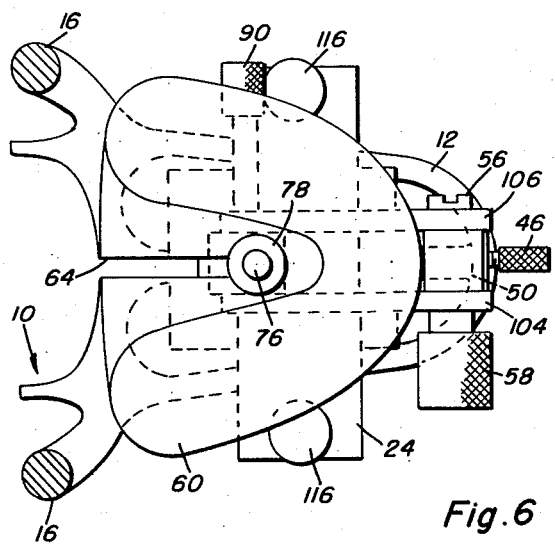
Figure 3 is a horizontal sectional view taken substantially upon the plane indicated by the section line 3—3 of Figure 1 and shows the general outline of the teeth aligning template in the relationship thereof to the other components of the articulator attachment.

Referring now to Figures 1 and 2 in particular, it will be seen that when the general attachment 18 is secured to the articulator 10, the base plate 22 thereof rests upon the lower jaws 12. Secondly, the lower clamp member 26 underlies the lower jaw 12 and the fasteners 28 extend between the clamp member 26 and the clamp member 24. Threadedly engaged on the upper ends of the fasteners 28 are nuts 116 which permit the clamping of the base plate 22 against the lower jaw 12. It is to be understood that the base plate 22 may be shifted both longitudinally of the jaw 12 by loosening the nuts 116 and shifting the clamp members 24 and 26, or transversely thereof by loosening the nuts 116 and shifting the base plate 22.

Referring now to Figures 6 and 7, it will be seen that there is illustrated a roller jaw 118 of a modified form of articulator which is referred to in general by the reference numeral 120. The articulator 120 is provided with a depending boss 122 on the roller jaw 118 thereof. Further, the roller jaw 118 is provided with an upstanding aligning pin 124. The base plate 22 is provided with a recess 126 for receiving the aligning pin 124.

When it is desired to clamp the articulator attachment 18 to the articulator 120, the base plate 22 is seated on the lower jaw 118 with the clamp members 24 and 26 removed, but the insert 32 remains in place. A fastener 128 is then passed out through the boss 122 and into the insert 32 to clamp the base plate 22 in place. With the exception of the manner in which the articulator attachment 18 as compared to the lower jaw 118 thereof, the use of the dental articulator 120 with the articulator attachment 18 will be the same as that of the articulator 10. Accordingly, no further description of the dental articulator 118 will be made.

In the use of the articulator 10 equipped with the articulator attachment 18, the customary procedure of first taking impressions of the upper and lower jaws of a patient and then running plaster through these impressions to form models of the upper and lower jaws is followed. Wax is then built up on the jaw models to approximately the height of the patient's natural teeth. These wax blocks are then considered bite models or bite blocks. These bite blocks are removed from the plaster models of the jaws and are placed in the patient's mouth. At this time they have changed in height so that the patient's jaws are at a comfortable distance apart. This is known as the bite.

In order that the teeth may be properly positioned with respect to the bite block, on the upper bite block the dentist draws a line which represents the distance of the teeth which show below the lip. This is known as the lip line.

After the jaw models and the bite blocks have been completed, the upper jaw model, which is illustrated in Figure 1 and referred to by the reference numeral 130, together with its bite block 132 is attached to the upper jaw 14 of the articulator 10. The lower jaw model and its associated bite block (not shown) are attached to the lower jaw 12 in a similar manner and the bite blocks are aligned.

In a full set of artificial dentures, there are 28 teeth, 14 in the upper and 14 for the lower. Each group of teeth includes two front teeth or centrals, two laterals which are disposed next to the central, and two cuspids which are disposed next to the laterals. These six teeth are called the anterior teeth. Behind the cuspids are the first and second bicuspids and the first and second molars. These last eight teeth are called the posterior teeth.

In setting up the teeth, the two centrals are first put in position so that the incisal edge extends through the lip line established on the upper bite block so that they split the center line of the model of the patient's mouth. The second molars are then set in the wax in the approximate position of the area where the molar teeth will eventually be placed. These four teeth then establish the occlusal plane.

The mounting plate on which the lower jaw model and its associate bite block is mounted is then removed from the lower jaw 12 of the articulator 10 and the articulator attachment 18 is clamped in place on the lower jaw 12. The pivot pins 54 and 88 are then loosened and the template 60 is then raised and adjusted so that the anterior section of the template touches the two centrals and the posterior region of the template touches the two molars. The occlusal plane is then established by the template 60.

The screw 46 is then released and the base block 50 is shifted with respect to the base plate 22 so that the median line of the two central teeth will split the median line on the template 60. At this time the screw 46 and the pivot 54 may then be tightened.

The occlusal plane of dentures, to obtain the correct esthetics, must be set parallel to the hinges of the jaw, called the mandibular joint. The hinges of the articulator simulate the mandibular joint and are parallel. By pushing the template mounting block 66 against the support block 80, the template 60 is self-leveling and is parallel to the hinges of the articulator 10.

After the template 60 has been properly positioned, the two lateral teeth are then placed in position in the wax bite block. The cuspids are then placed in the bite block 132 so that they touch the template 60.

As is best illustrated in Figures 2, the template 60 has a slight upward bend in the bicuspid area so that when the bicuspid teeth are placed against the template 60 they will have a slight tilt as is necessary.

After the six anterior teeth are positioned in the template, the template 60 must be moved forward or backward so that the bicuspids can be set against the template 60 in the area where they are supposed to be set to have the proper tilt. This is accomplished by loosening the screw 76 and sliding the template 60 which will remain in its proper occlusal point. The screw 76 is then set and the posterior teeth are set in place against the template 60.

After all of the upper teeth have been set, the articulator attachment 18 is then removed from the articulator 10. The lower jaw model and the lower bite block are then placed on the lower jaw 12 of the articulator 10 in alignment with the upper teeth and the lower teeth are set to match.

The tilting feature of the template mounting block 66 is used on occasions where, for some reason or another, the teeth on one side must be set lower than the teeth on the other side. This is necessary when a patient, smiling, raises one side of his lip quite a bit higher than the other side. Also, if the patient has a paralysis on one side of his face and is unable to raise the lips on that side, then the template 60 may be tilted to the desired angle utilizing the pivotal connection between the template mounting block 66 and the support block 80.

Another feature of the present invention is that it may be used to set up the lower teeth. This feature is needed when the patient has lost all of his lower teeth and still has some of his upper teeth. The six anterior teeth are set to the patient's upper teeth and then the upper jaw model and mounting plate therefor is removed from the articulator 10 and the present invention is mounted in their place. The template 60 is removed and turned upside down. The lower teeth are then set in the normal manner after the template has been properly positioned with the six anterior teeth as a guide.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a dental articulator comprising a base adapted to be secured to an articulator frame, a teeth aligning template, and means extending between said base and said template for selectively positioning said template relative to said base, said means including a template mounting block, a guide connection between said template and said template mounting block facilitating and limiting movement of said template longitudinally back and forth in a straight line in a preset plane in which said template is disposed.

2. An attachment for a dental articulator comprising a base adapted to be secured to an articulator frame, a teeth aligning template, and means extending between said base and said template for selectively positioning said template relative to said base, said means including a template mounting block, a support block, a pivotal connection between said template mounting block and said support block including a pivot pin carried by said support block, said pivot pin being generally parallel to a longitudinal axis of said template whereby said template may be tilted transversely of said longitudinal axis.

3. An attachment for a dental articulator comprising a base adapted to be secured to an articulator frame, a teeth aligning template, and means extending between said base and said template for selectively positioning said template relative to said base, said means including a template mounting block, a support block, a pivotal connection between said template mounting block and said support block including a pivot pin carried by said support block, said pivot pin being generally parallel to a longitudinal axis of said template whereby said template may be tilted transversely of said longitudinal axis, said pivot pin being threadedly engaged in said support block and normally locking said template mounting block to said support block.

4. An attachment for a dental articulator comprising a base adapted to be secured to an articulator frame, a teeth aligning template, and means extending between said base and said template for selectively positioning said template relative to said base, said means including an intermediate support block, elongated longitudinally disposed links intermediate said support block and said base, a first transverse pivot pin pivotally connecting said support block to said links and a second transverse pivot pin supporting said links relative to said base whereby said template may be selectively vertically positioned.

5. An attachment for a dental articulator comprising a base adapted to be secured to an articulator frame, a teeth aligning template, and means extending between said base and said template for selectively positioning said template relative to said base, said means including an intermediate support block, elongated longitudinally disposed links intermediate said support block and said base, a first transverse pivot pin pivotally connecting said support block to said links and a second transverse pivot pin supporting said links relative to said base, said links having elongated slots in second end portions thereof, said second pivot pin being positioned in said slots, whereby said template may be selectively vertically and longitudinally positioned.

6. An attachment for a dental articulator comprising a base adapted to be secured to an articulator frame, a teeth aligning template, and means extending between said base and said template for selectively positioning said template relative to said base, said means including a template mounting block, a guide connection between said template and said template mounting block facilitating and limiting movement of said template longitudinally back and forth in a straight line in a preset plane, said base including a transverse guideway, said means including a base block guidedly positioned in said guideway and selectively movable to transversely position said template.

7. An attachment for a dental articulator comprising a base adapted to be secured to an articulator frame, a teeth aligning template, and means extending between said base and said template for selectively positioning said template relative to said base, said means including a template mounting block, a guide connection between said template and said template mounting block facilitating and limiting movement of said template longitudinally back and forth in a straight line in a preset plane, said means including an intermediate support block, elongated longitudinally disposed links intermediate said support block and said base, a first transverse pivot pin pivotally connecting said support block to said links and a second transverse pivot pin supporting said links relative to said base whereby said template may be selectively vertically positioned.

8. An attachment for a dental articulator comprising a base adapted to be secured to an articulator frame, a teeth aligning template, and means extending between said base and said template for selectively positioning said template relative to said base, said means including a template mounting block, a guide connection between said template and said template mounting block facilitating and limiting movement of said template longitudinally back and forth in a straight line in a preset plane, a support block, a pivotal connection between said template mounting block and said support block including a pivot pin carried by said support block, said pivot pin being generally parallel to a longitudinal axis of said template whereby said template may be tilted transversely of said longitudinal axis.

9. An attachment for a dental articulator comprising a base addapted to be secured to an articulator frame, a teeth aligning template, and means extending between said base and said template for selectively positioning said template relative to said base, said means including a template mounting block, a support block, a pivotal connection between said template mounting block and said support block including a pivot pin carried by said support block, said pivot pin being generally parallel to a longitudinal axis of said template whereby said template may be tilted transversely of said longitudinal axis, said means including an intermediate support block, elongated longitudinally disposed links intermediate said support block and said base, a first transverse pivot pin pivotally connecting said support block to said links and a second transverse pivot pin supporting said links relative to said base, whereby said template may be selectively vertically positioned.

10. An attachment for a dental articulator comprising a base adapted to be secured to an articulator frame, a teeth aligning template, and means extending between said base and said template for selectively positioning said template relative to said base, said means including a template mounting block, a support block, a pivotal connection between said template mounting block and said support block including a pivot pin carried by said support block, said pivot pin being generally parallel to a longitudinal axis of said template whereby said template may be tilted transversely of said longitudinal axis, said base including a transverse guideway, said means including a base block guidedly positioned in said guideway and selectively movable to transversely position said template.

11. An attachment for a dental articulator comprising a base adapted to be secured to an articulator frame, a teeth aligning template, and means extending between said base and said template for selectively positioning said template relative to said base, said means including an intermediate support block, elongated longitudinally disposed links intermediate said support block and said base, a first transverse pivot pin pivotally connecting said support block to said links and a second transverse pivot pin supporting said links relative to said base whereby the template may be selectively vertically positioned, said base including a transverse guideway, said means including a base block guidedly positioned in said guideway and selectively movable to transversely position said template, said second pivot pin being carried by said base block.

12. An attachment for a dental articulator comprising a base adapted to be secured to an articulator frame, a teeth aligning template, and means extending between said base and said template for selectively positioning said template relative to said base, said means including a template mounting block, a guide connection between said template and said template mounting block facilitating and limiting movement of said template longitudinally back and forth in a straight line in a preset plane, a support block, a pivotal connection between said template mounting block and said support block including a pivot pin carried by said support block, said pivot pin being generally parallel to a longitudinal axis of said template whereby said template may be tilted transversely of said longitudinal axis, said means including an intermediate support block, elongated longitudinally disposed links intermediate said support block and said base, a first transverse pivot pin pivotally connecting said support block to said links and a second transverse pivot pin supporting said links relative to said base, whereby said template may be selectively vertically positioned.

13. An attachment for a dental articulator comprising a base adapted to be secured to an articulator frame, a teeth aligning template, and means extending between said base and said template for selectively positioning said template relative to said base, said means including a template mounting block, a guide connection between said template and said template mounting block facilitating and limiting movement of said template longitudinally back and forth in a straight line in a preset plane, a support block, a pivotal connection between said template mounting block and said support block including a pivot pin carried by said support block, said pivot pin being generally parallel to a longitudinal axis of said template whereby said template may be tilted transversely of said longitudinal axis, said means including an intermediate support block, elongated longitudinally disposed links intermediate said support block and said base, a first transverse pivot pin pivotally connecting said support block to said links and a second transverse pivot pin supporting said links relative to said base, whereby said template may be selectively vertically positioned, said base including a transverse guideway, said means including a base block guidedly positioned in said guideway and selectively movable to transversely position said template, said second pivot pin being carried by said base block.

References Cited in the file of this patent

UNITED STATES PATENTS

| | | |
|---|---|---|
| 2,448,085 | Dickson | Aug. 31, 1948 |
| 2,608,761 | Scott | Sept. 2, 1952 |